(12) United States Patent
Stroup

(10) Patent No.: US 11,345,548 B2
(45) Date of Patent: May 31, 2022

(54) SYSTEM AND METHOD FOR PROTECTING PORTIONS OF MATERIAL PROCESSING EQUIPMENT USED IN AGGREGATE INDUSTRY

(71) Applicant: Terex USA, LLC, Westport, CT (US)

(72) Inventor: David Bryan Stroup, Burt, MI (US)

(73) Assignee: Terex USA, LLC, Westport, CT (US)

( * ) Notice: Subject to any disclaimer, the term of this patent is extended or adjusted under 35 U.S.C. 154(b) by 0 days.

(21) Appl. No.: 17/066,725

(22) Filed: Oct. 9, 2020

(65) Prior Publication Data

US 2021/0107737 A1  Apr. 15, 2021

Related U.S. Application Data

(60) Provisional application No. 62/913,397, filed on Oct. 10, 2019.

(51) Int. Cl.
*B65G 11/18* (2006.01)
*B65G 21/20* (2006.01)
*B65G 11/16* (2006.01)

(52) U.S. Cl.
CPC ........ *B65G 11/186* (2013.01); *B65G 21/2081* (2013.01); *B65G 11/166* (2013.01); *B65G 2207/48* (2013.01)

(58) Field of Classification Search
CPC ............... B65G 11/186; B65G 11/166; B65G 21/2081; F16B 1/00; F16B 2001/0035
See application file for complete search history.

(56) References Cited

U.S. PATENT DOCUMENTS 7,837,020 B2 * 11/2010 Pittman ................ B65G 11/166
193/2 R

FOREIGN PATENT DOCUMENTS

WO  WO-2017190200 A1 * 11/2017 ............ F16B 5/0233

* cited by examiner

*Primary Examiner* — William R Harp
(74) *Attorney, Agent, or Firm* — Simmons Perrine Moyer Bergman PLC

(57) ABSTRACT

A magnetic fastener and wear liner combination for use with material processing equipment for processing aggregate material, where a reverse taper counter bore hole of the wear liner is made to couple and decouple from a magnetic fastener which has a urethane cap, with a urethane cap reverse taper side. The magnetic fasteners are re-useable on replacement liners as the liners need replacement. The attachment and detachment of the magnetic fasteners is made to be simple and secure.

18 Claims, 3 Drawing Sheets

SYSTEM AND METHOD FOR PROTECTING PORTIONS OF MATERIAL PROCESSING EQUIPMENT USED IN AGGREGATE INDUSTRY

CROSS REFERENCE TO RELATED APPLICATIONS

The present application claims the benefit of the filing date of provisional patent application having Ser. No. 62/913,397 filed on Oct. 10, 2019 by David Bryan Stroup entitled Quick Change Removable Magnetic Fastener and Protective Liner, which application is incorporated herein in its entirety by this reference.

FIELD OF THE INVENTION

The present invention generally relates to systems and methods for protecting portions of material processing equipment, and more particularly relates to liners for steel members of material processing equipment.

BACKGROUND OF THE INVENTION

In the aggregate industry, liners are often used to protect many portions of equipment used in operations including portions of vibratory screens, crushers, hoppers and chutes. A common process currently used for protecting the steel components in the day to day aggregate plant is to use a bolt in or magnetically bonded polyethylene or polyurethane liner.

The bolt in liners have been used extensively in the industry, but they can be problematic. For example, when using a bolt in liner, it often requires a steel backer plate with holes or some sort of attachment point to which the liner can attach. Additionally, the time to install and remove the bolts, can be significant. With exposure to dirt and mud, it is often very hard to remove bolts without stripping the threads or breaking them off. Sometimes it may be necessary to cut them off with a torch, but with a concomitant increase in risk of a fire.

Another option is to use a molded liner with magnets molded into the liner. These liners often work very well; however, often the magnets are not reusable and/or the liners are somewhat limited in their construction and are very heavy.

Consequently, there exists a need for a liner that is easily attached and easily removed which is easily molded to multiple shapes for multiple different applications without the cumbersome hardware of bolts, the added expense of liners with backer plates or configuration limitations with magnets molded at fixed positions in the liner

SUMMARY OF THE INVENTION

It is an object of the present invention to improve the method of attachment of a liner to a steel structure in material processing equipment.

It is a feature of the present invention to effectively utilize a liner having a reverse taper counter bore hole therethrough.

It is an advantage of the present invention to allow for snap in locking of a magnet to a liner.

The present invention is carried out in a "bolt-less and/or integrated magnet-less" manner, in a sense that the need for a bolt and backplate or an application specific molded-in magnet can be eliminated or at least greatly reduced, in many situations. Additionally, the present invention provides a "reusable magnet" solution by reducing the effort and time needed to remove a magnet from one liner and replace it into a new liner.

Accordingly, the present invention is a method of replacing a magnet holding a liner to a steel support in material processing equipment, comprising the steps of:

providing a piece of material processing equipment, configured for use with aggregate material, where the piece of material processing equipment is one of a crusher, a vibrating screen, a hopper, and a chute; where a portion thereof is a ferrous metal member that is exposed to abrasion by contact with aggregate material;

displacing a plurality of magnetic fasteners coupled to said first liner from said ferrous metal member;

removing the first liner from the ferrous metal member; and inserting each of said plurality of magnetic fasteners, into one of a plurality of reverse taper counter bore holes in a second liner and allowing said plurality of magnetic fasteners to engage said ferrous metal member.

Additionally, the present invention is an improved system for protecting a steel member in material processing equipment comprising:

a first liner configured to cover and protect a predetermined portion of a ferrous metal member in a piece of material processing equipment, said first liner having a plurality of reverse taper counter bore holes therein;

a second liner configured to cover and protect a predetermined portion of a ferrous metal member in a piece of material processing equipment, said second liner having a plurality of reverse taper counter bore holes therein;

a plurality of magnetic fasteners each configured to be lockable inside of and removable from each of said plurality of reverse taper counter bore holes in said first liner and in said second liner; and said plurality of magnetic fasteners being further configured to magnetically engage said ferrous metal member while disposed in either one of said first liner and said second liner while said either one of said first liner and said second liner is disposed on said predetermined portion of said ferrous metal member.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to a liner for a steel support in a piece of equipment used for material processing, it should be understood that the innovative and beneficial aspect of the systems and methods of the present invention can be implemented for other ferrous metal components of material processing equipment as well.

The systems and methods of the present invention described herein can be viewed as examples of many potential variations of the present invention which are protected hereunder. The following details are intended to aid in the understanding of the invention whose scope is defined in the claims appended hereto. The following description should be viewed as an example of other embodiments of the present invention, which may employ systems and methods which deviate from the details described below, without departing from the spirit and the intended scope of the invention.

Figure 1:
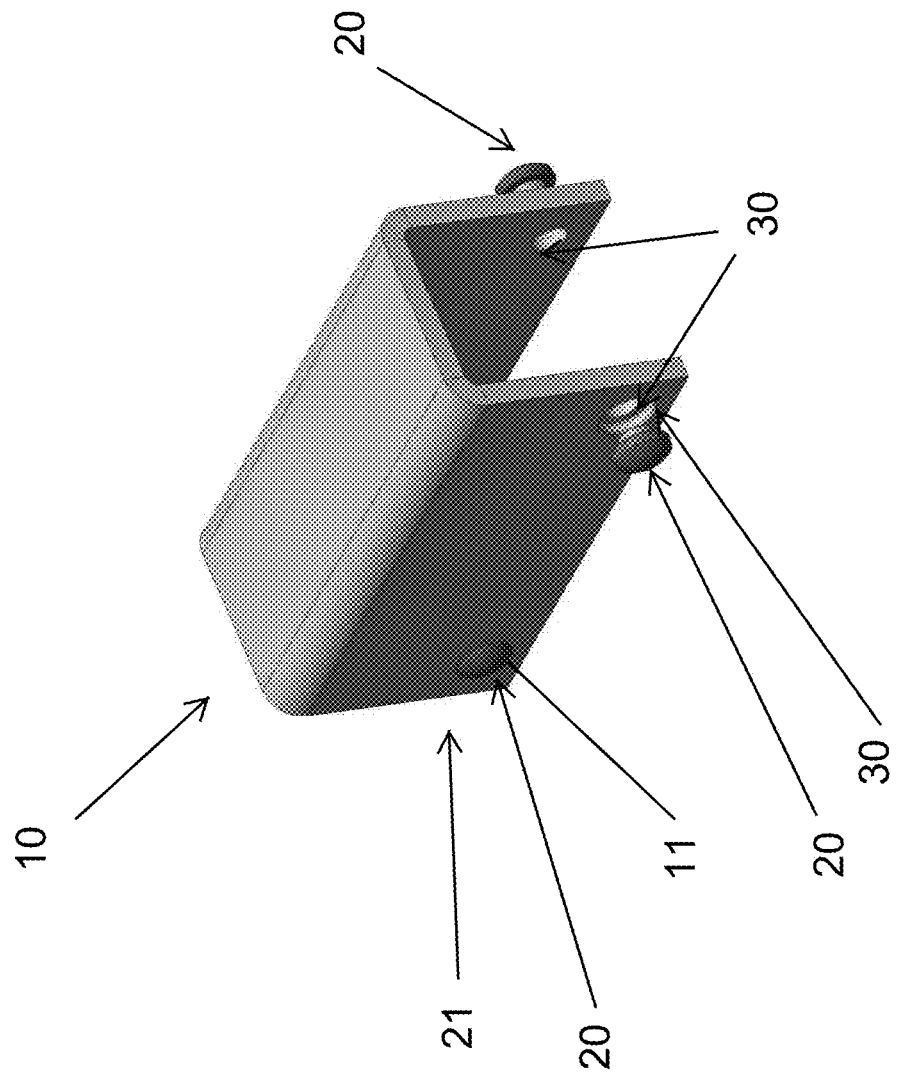
FIG. 1 is a perspective view of a representative molded liner of the present invention together with fastener receiving holes, and fasteners inserted and in the process of being inserted.

Now referring to the drawings wherein like numerals refer to like matter throughout, and more particularly in FIG. 1, there is shown a representative liner of the present invention, which is shown to be formed to be place over an elongated steel support, having a substantially rectangular cross-section. The molded liner 10 of the present invention may be made of the same types of material that liners have been made of for many years in prior art liners for use in material processing equipment. These well know prior art liner materials could be used herein for the molded liners 10, of the present invention, either in combination, alone, or in conjunction with or substituted by polyethylene and polyurethane. Supports and other components with differing shapes are capable of being protected by the present invention, by merely forming the liner in a shape which is designed to accommodate such different shaped support. Typically, the support may be rectangular or, in some applications, having a shape with better ability to shed material striking the top portion of the liner. For example, if the support is circular in cross-section, then the liner may be semi-circular and, if the support is triangular or trapezoidal in shape, then the liner may also have an angled shape and/or apex. FIG. 1 shows a molded liner 10 with a plurality of reverse taper counter bore holes 30 therein. The term "molded liner" is used herein to include liners which are produced in a predefined mold having predetermined dimension, or that are simply "molded" by being folded over a support or structural member to be protected from abrasive wear. Molded liner 10 is shown molded for use on a rectangular cross-section steel support member (not shown). Three re-usable magnetic fasteners 20 are shown, with one being located at filled location 11, where it is locked into a reverse taper counter bore hole 30. The remaining two magnetic fasteners 20, each, are shown positioned to be ready for insertion and snap locking into the reverse taper counter bore holes 30, so as to prevent the magnetic fastener 20 from falling out of the reverse taper counter bore holes 30. The arrangement of the liner with respect to the structural member, the location and orientation of the magnetic fasteners 20 are preferably such that most if not all of the magnetic fasteners 20 are located and/or oriented to minimize exposure to falling aggregate material.

Figure 2:
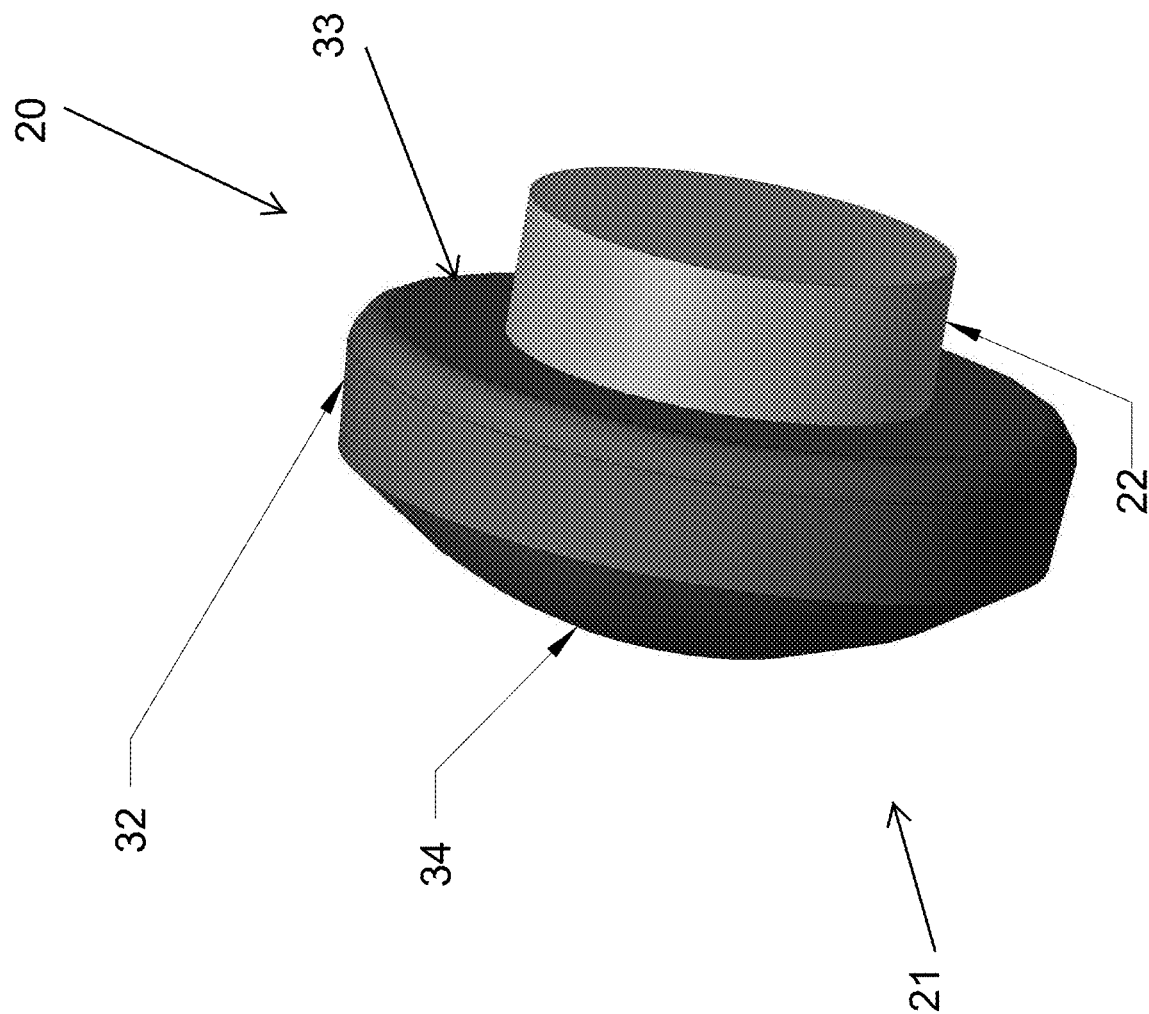
FIG. 2 is a close-up perspective view of a fastener of FIG. 1.

Now referring to FIG. 2, which shows a perspective view of the magnetic fastener 20 of FIG. 1, which shows a cap 21 coupled to a magnet 22.

Cap 21 may be of any suitable material, but urethane may be preferred. Urethane cap 21 is shown with a urethane cap reverse taper side 32, urethane cap backside 33, and urethane cap front apex portion 34. The magnet 22 can be any suitable magnet including a rare earth magnet.

Figure 3:
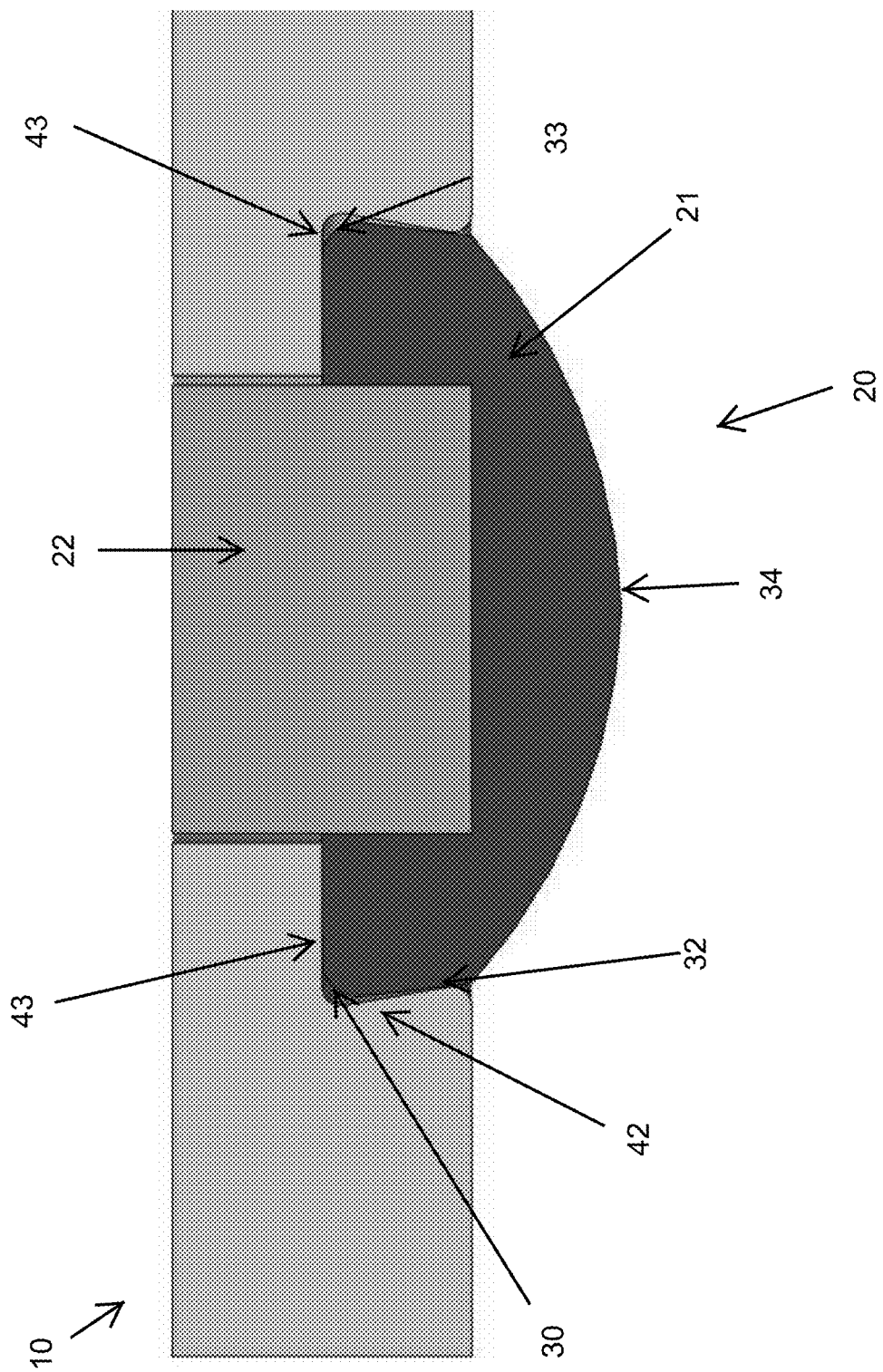
FIG. 3 is a cross-sectional view of a fastener of FIGS. 1 and 2 which has been inserted into a reverse taper counter bore hole 30.

Now referring to FIG. 3, there is shown a cross-sectional view of the magnetic fastener 20 disposed in a reverse taper counter bore holes 30 in a molded liner 10. Molded liner 10 is made to be placed over portions of a support member of a material processing plant for use with aggregate material. Molded liner 10 has a specially constructed void therethrough called a reverse taper counter bore hole 30, which accepts a magnetic fastener 20 therein by inserting the magnet 22 end first therein and pushing it further in until the magnet 22 is in its closest proximity to the support member that the molded liner 10 is provided to protect. Reverse taper counter bore holes 30 is defined by bore hole backstop side 43 which may be perpendicular to an outside surface of the magnet 22. The bore hole backstop side 43 is not at right angles with respect to bore hole taper side 42. The difference from a 90 degree angle results in a reverse taper, which allows the urethane cap 21 to be inserted into the reverse taper counter bore holes 30 and when fully snapped into a locked configuration, provide a secure retention of the magnetic fastener 20 in the reverse taper counter bore holes 30 and therefore provide for secure magnetic retention of the molded liner 10 with a support member to be protected.

The precise implementation of the present invention will vary depending upon the particular application.

It is thought that the method and systems of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof.

I claim:

1. A method of extending the useful life of portions of material processing equipment, comprising the steps of:

providing a piece of material processing equipment, configured for use with aggregate material, where the piece of material processing equipment is one of a crusher, a vibrating screen, a hopper, and a chute; where a portion thereof is a ferrous metal member that is exposed to abrasion by contact with aggregate material;

displacing, from said ferrous metal member, a magnetic fastener, coupled to a first liner;

removing the first liner from the ferrous metal member; and inserting a magnetic fastener, into a hole in a second liner and allowing said magnetic fastener to engage said ferrous metal member.

2. The method of claim 1 wherein said step of displacing, from said ferrous metal member, a magnetic fastener involves removing said magnetic fastener from said first liner before said step of removing said first liner from the ferrous metal member.

3. The method of claim 1 further comprising a step of removing a plurality of magnetic fasteners from said first liner after said first liner has been removed from said ferrous metal member.

4. The method of claim 3 wherein said step of removing a plurality of magnetic fasteners is performed by pressing an exposed magnet portion of each of said plurality of magnetic fasteners and causing said exposed magnet portion of each of said plurality of magnetic fasteners to pass into and through a reverse taper counter bore hole, through said first liner.

5. The method of claim 4 wherein said step of inserting a magnetic fastener in a hole in a second liner involves a urethane cap becoming locked behind a bore hole taper side in said reverse taper counter bore hole.

6. A system for extending the useful life of a ferrous metal member of a piece of material processing equipment comprising:

a first liner configured to cover and protect a predetermined portion of a ferrous metal member in a piece of material processing equipment, said first liner having a plurality of reverse taper counter bore holes therein;

a second liner configured to cover and protect a predetermined portion of a ferrous metal member in a piece of material processing equipment, said second liner having a plurality of reverse taper counter bore holes therein;

a plurality of magnetic fasteners each configured to be lockable inside of and removable from each of said plurality of reverse taper counter bore holes in said first liner and in said second liner; and said plurality of magnetic fasteners being further configured to magnetically engage said ferrous metal member while disposed in either one of said first liner and said second liner while said either one of said first liner and said second liner is disposed on said predetermined portion of said ferrous metal member.

7. The system of claim 6 wherein said first liner and said second liner are manufactured to the same specifications.

8. The system of claim 7 wherein said first liner and said second liner are interchangeable without affecting performance of said system.

9. The system of claim 8 wherein said first liner and said second liner are manufactured to different specifications.

10. A system for extending the useful life of a ferrous metal portion of a piece of material processing equipment comprising:

a first liner configured to cover and protect a first predetermined portion of a first ferrous metal member in a piece of material processing equipment, said first liner having a first plurality of holes therein;

a plurality of magnetic fasteners each configured to be lockable inside of and removable from each of said plurality of holes in said first liner;

said plurality of magnetic fasteners being further configured to magnetically engage said first ferrous metal member while disposed in said first liner while said first liner is disposed on said predetermined portion of said ferrous metal member.

11. The system of claim 10 wherein said first plurality of holes includes a first plurality of reverse taper counter bore holes.

12. The system of claim 11 further comprising: a second liner configured to cover and protect a second predetermined portion of a second ferrous metal member in a piece of material processing equipment, said second liner having a second plurality of reverse taper counter boreholes therein.

13. The system of claim 10 further comprising: a second liner configured to cover and protect a second predetermined portion of a second ferrous metal member in a piece of material processing equipment, said second liner having a second plurality of holes therein.

14. A system for extending the useful life of a ferrous metal portion of a piece of material processing equipment comprising:

a first protective member configured to cover and protect a first predetermined portion of a first ferrous metal member in a piece of material processing equipment;

a plurality of magnetic fasteners each configured to be coupled to and removable from said first protective member; and said plurality of magnetic fasteners being further configured to magnetically engage said first ferrous metal member while coupled to said first protective member while said first protective member is disposed on said predetermined portion of said ferrous metal member.

15. The system of claim 14 wherein said first protective member is a protective liner.

16. The system of claim 14 wherein said plurality of magnetic fasteners are disposed inside said first protective member.

17. The system of claim 16 wherein each of said plurality of magnetic fasteners is lockable inside of and removable from one of a first plurality of reverse taper counter bore holes in said first protective member.

18. The system of claim 17 further comprising: a second protective member configured to cover and protect a second predetermined portion of a second ferrous metal member in a piece of material processing equipment, said second protective member having a second plurality of reverse taper counter bore holes therein.

* * * * *